(12) United States Patent
Yuan

(10) Patent No.: US 7,288,607 B2
(45) Date of Patent: Oct. 30, 2007

(54) HIGH SOLIDS PRIMER COMPOSITION BASED ON EPOXY RING OPENING CURING REACTION

(75) Inventor: San C. Yuan, Commerce Township, MI (US)

(73) Assignee: E. I. du Pont de Nemours & Co., Wilmington, DE (US)

( * ) Notice: Subject to any disclaimer, the term of this patent is extended or adjusted under 35 U.S.C. 154(b) by 382 days.

(21) Appl. No.: 10/963,345

(22) Filed: Oct. 12, 2004

(65) Prior Publication Data

US 2006/0079637 A1 Apr. 13, 2006

(51) Int. Cl.
*B32B 15/08* (2006.01)
*B32B 27/38* (2006.01)
*C08L 63/00* (2006.01)

(52) U.S. Cl. ............... 525/510; 428/413; 428/416; 428/457; 525/476; 525/523

(58) Field of Classification Search ............... None
See application file for complete search history.

(56) References Cited

U.S. PATENT DOCUMENTS

| | | | |
|---|---|---|---|
| 5,023,141 A | 6/1991 | Willey | |
| 5,492,968 A | 2/1996 | Nakai et al. | |
| 5,684,095 A * | 11/1997 | Morimoto et al. | 525/438 |
| 5,760,137 A | 6/1998 | Miyazoe et al. | |
| 5,770,268 A * | 6/1998 | Kuo et al. | 427/386 |
| 6,174,967 B1 * | 1/2001 | Soucek et al. | 525/476 |
| 6,201,070 B1 * | 3/2001 | Kumabe et al. | 525/327.3 |
| 6,268,456 B1 * | 7/2001 | Gregorovich et al. | 528/35 |
| 6,329,489 B1 * | 12/2001 | Gregorovich et al. | 528/29 |
| 6,864,311 B2 * | 3/2005 | Breunig et al. | 524/588 |
| 6,962,948 B2 * | 11/2005 | Ghoshal | 522/31 |
| 7,026,398 B2 * | 4/2006 | Monkiewicz et al. | 525/100 |
| 2002/0035199 A1 | 3/2002 | Breunig et al. | |
| 2003/0186066 A1 | 10/2003 | Monkiewicz et al. | |
| 2003/0194561 A1 | 10/2003 | Bier et al. | |
| 2005/0170187 A1 | 8/2005 | Ghoshal | |
| 2007/0042191 A1 * | 2/2007 | Carter et al. | 428/413 |

FOREIGN PATENT DOCUMENTS

| | | |
|---|---|---|
| DE | 40 08 343 | 9/1990 |
| EP | 0 051 966 | 5/1982 |
| EP | 0 754 739 | 1/1997 |

OTHER PUBLICATIONS

Derwent accession No. 1990-291488 for German Patent No. 4,008,343 A, Kansai Paint Company, Limited, Sep. 20, 1990, two pages.*
Chemical abstract registry No. 78-10-4 for tetraethyl silicate, 1907, two pages.*
Chemical abstract registry No. 12002-26-5 for Methyl Silicate 56, or tetramethoxysilane polymer, 1907, two pages.*
Search Report for International Application No. PCT/US2005/036767.

* cited by examiner

*Primary Examiner*—Robert Sellers
(74) *Attorney, Agent, or Firm*—Kevin S. Dobson

(57) ABSTRACT

This invention relates to a primer composition having a low VOC content useful in the manufacture of automobiles and trucks in which the film forming binder contains:
  a) a cycloaliphatic or polycycloaliphatic epoxy compound;
  b) an alkoxy silane or silicate reactive diluent; and,
  c) a curing catalyst to catalyze the reaction between (a) and (b).

These primers are characterized in that the curing or crosslinking reaction is presumably based, at least in part, on a ring opening polymerization reaction between the epoxy structures of (a) and silanol groups formed on (b) in the presence of atmospheric moisture and acid. Curing chiefly utilizing a ring opening reaction of the forgoing epoxy structures with the forgoing reactive diluents not only avoids volatile compounds from being generated and released into the atmosphere during the curing process, but also keeps the viscosity low enough for practical application such as by spraying. These primers are especially useful in reducing emissions, while also meeting today's performance requirements, such as ease of application and excellent physical properties such as corrosion resistance, a high level of adhesion to primed and unprimed substrates, and provide a surface to which conventional automotive topcoats will adhere.

17 Claims, No Drawings

HIGH SOLIDS PRIMER COMPOSITION BASED ON EPOXY RING OPENING CURING REACTION

FIELD OF THE INVENTION

This invention is directed to a primer composition and in particular to a high solids solvent borne primer having a low VOC content (volatile organic content) primarily useful for automobiles and trucks.

BACKGROUND OF THE INVENTION

Primer compositions are well known in the art and are widely used in the manufacture of automobiles and trucks as shown in Simon U.S. Pat. No. 4,232,090 issued Nov. 4, 1980. In recent years, to meet the increasingly demanding regulations to reduce emissions or VOC content of automotive coatings, high-solids liquid solvent borne primers have been developed that contain less solvents, but still have sprayable viscosities and can be applied with conventional equipment. For instance, high-solids polyester primers are shown in Ambrose et al. U.S. Pat. No. 4,535,132 issued Aug. 13, 1985 and in Willey U.S. Pat. No. 5,023,141 issued Jun. 11, 1991. However, none of these compositions meet the current needs of modern automotive and truck manufacturing plants that are demanding yet even lower emissions, while also meeting today's performance requirements, such as the ability to be applied without modification in existing plant spray booths, and that have excellent physical properties such as corrosion resistance and a high level of adhesion to primed and unprimed metal substrates, primed and unprimed plastic substrates and provide a surface to which conventional topcoats will adhere.

It would be advantageous to have a high-solids solvent borne primer composition with this unique combination of properties.

SUMMARY OF THE INVENTION

The present invention provides a high-solids or low solvent moisture-curable primer composition having a solids content of at least 80% by weight, based on weight of total coating composition, comprising a film-forming binder and preferably pigments in a pigment to binder ratio of about 1:100-150:100; wherein the binder contains:

(a) a cycloaliphatic or polycycloaliphatic epoxy resin;
(b) at least one reactive diluent selected from the group consisting of an alkoxy silane compound, an alkoxy silicate compound, and mixtures thereof capable of reacting with component (a) in the presence of an effective amount of catalyst; and
(c) an effective amount of a curing catalyst, preferably a thermally activated strong acid catalyst.

The invention is characterized in that the epoxy resin is crosslinked and cured chiefly utilizing a ring opening reaction between the forgoing epoxy structures and silanol groups formed on the reactive diluent in the presence of atmospheric moisture and acid.

Curing chiefly by a ring opening reaction not only avoids emission regulated organic compounds from being generated and released into the atmosphere during the curing process, but also keeps the viscosity low enough to be able to work in present day spray booths already in place in automotive and truck assembly plants. Occurrence of byproducts is little observed in the curing reaction.

Optionally, the binder may also include (d) a crosslinking agent, such as a monomeric or polymeric alkylated melamine formaldehyde crosslinking agent, that is reactive with functional groups formed on components (a) and/or (b) during the curing process to provide for additional crosslinking and enhanced film properties.

The present invention contemplates the use of coatings having up to 100 percent solids content and having a VOC content less than 2.5 pounds per gallon, more preferably less than 2.0 pounds per gallon. Even at such high solids and low VOC levels, the coatings have sufficient low viscosity so as to enable easy application such as by spraying, etc., without the need to employ added solvent that would increase the undesirable VOC content.

Also included within the scope of this invention is a substrate, such as a vehicle body or part thereof, coated with the primer coating composition disclosed herein.

The present composition is especially useful as a primer surfacer when finishing automotive and truck exteriors.

DETAILED DESCRIPTION OF THE INVENTION

The coating compositions of this invention provide high-solids coating systems that deliver much lower VOCs (volatile organic content) than conventional solvent borne primers. When used as a primer, the compositions of this invention form finishes that are hard, tough and durable within a short period of time after application, have excellent adhesion to a variety of substrates such as cold rolled steel, phosphatized steel, phosphatized steel primed with a primer applied by electrocoating, plastic substrates which may be primed or unprimed such as polyester reinforced fiber glass, reaction injection molded urethanes, partially crystalline polyamides and other plastic substrates, and provide a surface to which conventional topcoats will adhere.

The primer composition is particularly useful on the aforementioned substrates since it can be used as a surfacer to cover imperfections in surfaces of primed metal and plastic substrates. For example, electrocoating of metal substrates with a primer often results in a finish that has small imperfections and this composition can be applied to form a smooth, glossy finish that is free from imperfections. Also, plastic substrates such as SMC (sheet molding compound) which is a polyester reinforced with fiber glass contain many surface imperfections and must be coated with a surfacer. By increasing the pigmentation used in the composition, an easily sandable finish is formed that covers imperfections and can be sanded to a smooth finish which is then topcoated with conventional acrylic enamel finishes. This type of coating is commonly referred to as a "primer surfacer".

A particular advantage of the novel coating composition of this invention is that it has a low VOC content, i.e., a VOC content of less than 0.24 kilogram of organic solvent per liter (2 pounds per gallon) of composition. The novel coating composition can readily be formulated to have a VOC of less than 0.12 kg per liter (1 pound per gallon), which is most desirable.

The VOC of the coating is determined in accordance with the procedure provided in EPA Method 24.

In order to achieve such low VOC, the primer composition of this invention is formulated as a high-solids composition containing little or no volatile organic solvents. "High solids composition" as used herein means a coating composition having a total solids concentration of at least 80 percent, preferably of at least 90 percent, in weight percentages based on the total weight of the composition. It should by understood that "total solids" refers to the total amount of non-volatile components in the composition even though some of the components may be non-volatile liquids rather than solids at room temperature. Correspondingly, the present composition generally contains only up to about 20% by weight of a volatile organic liquid carrier, which usually is a solvent for the binder, preferably up to about 10% by weight.

Even at such high solids levels, the compositions of this invention still have sufficient low viscosity for practical application, such as by spraying, without having to employ an appreciable amount of volatile solvents. Even in absence of solvent, these compositions are usually a flowing liquid at room temperature that can be applied with conventional spray painting equipment located in automobile and truck assembly plants.

In general, the solids content of the coating is made up of a film-forming portion and non film-forming portion. The film-forming portion of the coating composition of this invention is referred to as the "binder" or "binder solids". The binder generally includes all the film-forming components that contribute to the solid organic portion of the cured composition. The binder in the present invention typically makes up about 50-95% of the total solids present in the composition. Generally, catalysts, pigments, and non-polymeric chemical additives such as stabilizers are not considered part of the binder solids. Non-binder solids other than pigments usually do not amount to more than about 5-10% by weight of the composition. In this disclosure, the term "binder" or "binder solids" refers to the curable film-forming aliphatic epoxy materials, the silane or silicate reactive diluents, the optional crosslinking agent and all other optional film-forming components, as are further described hereinbelow.

The coating composition of the present invention includes, as part of the film-forming binder, an aliphatic epoxide resin. The coating composition generally includes from about 30-95% by weight, preferably from about 30-70% by weight aliphatic epoxide resin, based on the weight of the binder. The aliphatic epoxide compound used in the primer composition of the present invention is a cycloaliphatic or polycycloaliphatic epoxide. Suitable cycloaliphatic or polycycloaliphatic epoxide resins for purposes of this invention are those having an average of one, two, three or higher 1,2-epoxy groups per molecule. Among these materials, polyfunctional epoxides, particularly diepoxides and trifunctional epoxides are generally preferred. These compounds are well known in the art and are commercially available from Dow Chemical, Midland, Mich.

Examples of suitable polyfunctional cycloaliphatic and polycycloaliphatic epoxides are 3,4-epoxycyclohexylmethyl 3,4-epoxycyclohexanecarboxylate (1,4-cyclohexanedimethanol diglycidyl ether), 3,4-epoxy-6-methyl-cyclohexylmethyl 3,4-epoxy-6-methylcyclohexanecarboxylate, vinyl cyclohexane diepoxide, cyclohexane diepoxide, cyclopentadiene diepoxide, limonen diepoxide, alpha-pinene diepoxide 3,4-epoxycyclohexyl-5,5-spiro-3,4-epoxycyclohexane m-dioxane, bis(3,4-epoxycyclohexylmethyl)adipate, and the like.

Although polyfunctional cycloaliphatic epoxides are generally preferred, monoepoxides can be used in the formulation for such purposes as further viscosity reduction. Illustrative of the monoepoxides are limonene monoepoxide, .alpha.-pinene monoepoxide, vinyl 3,4-epoxycyclohexane, norbornene monoepoxide, cyclohexane monoepoxide, 3,4-epoxy derivatives of alkoxylated and/or lactone derivatives of tetrahydrobenzyl alcohol, and the like.

Other suitable cycloaliphatic and polycycloaliphatic epoxide resins are described in U.S. Pat. No. 5,043,221 hereby incorporated by reference herein.

In addition, mixtures of any of the forgoing cycloaliphatic or polycycloaliphatic epoxies can also be used.

The coating composition of this invention further includes, as part of the binder, from about 5 to 30% by weight, based on the weight of the binder, of an alkoxy silane or alkoxy silicate functional reactive diluent, that is reactive (in the presence of atmospheric moisture and acid catalyst described below) with the epoxide resin, itself, and optionally other materials in the coating composition to form a curable coating composition. These materials are preferably low molecular weight compounds having a number average molecular weight less than about 5,000, more preferably less than about 2,500, and even more preferably less than about 1,000.

Examples of alkoxy silane reactive diluents, include, but are not limited to, alkoxysilated 4-vinyl cyclohexene, alkoxysilated limonene, 5-(2-trimethoxysilylethyl)-trimethoxysilylnorbomane, 1,4-bis[3-trimethoxysilylpropyloxymethyl] cyclohexane, other silane containing compounds, with more than one trimethoxysilyl group, disclosed in U.S. Pat. No. 5,719,251 which is hereby incorporated by reference herein; 1,2-bis(trimethoxysilyl)ethane, 1,6-is(trimethoxysilyl)hexane, 1,8-is(trimethoxysilyl)octane, 1,4-is(trimethoxysilylethyl)benzene, 1,5,9-tris(trimethoxysilyl)cyclododecatriene, 1,2,4-tris(2-trimethoxysilylethyl)cyclohexane, other silane containing compounds, with more than one trimethoxysilyl group, disclosed in U.S. Pat. No. 6,080,816 which is hereby incorporated by reference herein; bis(3-trimethoxysilyl-2-hydroxypropyl)succinate, 1,4-cyclohexylenedimethylene-N-trimethoxypropyl carbamate, other silane containing compounds, with more than one trimethoxysilyl group, disclosed in U.S. Pat. No. 6,268,456 which is hereby incorporated by reference herein; an oligomer produced when bis(trimethoxysilyl)-limonene is contacted with water, other silane containing compounds, with more than one trimethoxysilyl group, disclosed in U.S. Pat. No. 6,329,489 which is hereby incorporated by reference herein.

In all of the alkoxy silane examples shown above, only the trimethoxy silane functionality was shown. However one skilled in the art would understand that all of these silane compounds could have triethoxy or higher alkoxy functionality and mixed methoxy/alkoxy functionality such as a methoxydiethoxysilyl group. Also the reactive tri-functional character of the silane groups can be reduced with partial alkyl substitution, for example a methyldimethoxysilyl group.

In the presence of water and acid catalyst (described below), silanol groups formed on the alkoxysilanes can react with the cationic polymerization radical formed by ring opening of the epxoide oxarine ring to form a polymer that can crosslink further through secondary hydroxyl groups formed during ring opening, with itself, another alkoxysilane and optionally other components, such as melamine or alkoxy silicates, in the coating system and form a three-dimensional coating film network having tough and durable silicate polymers and crosslinks.

Alkoxy silicate functional reactive diluents can also be used. These include but are not limited to tetraethyl silicate, hexaethyl disilicate and other oligomers of tetraethyl silicate, tetramethyl silicate, hexamethyl disilicate and other oligomers of tetramethylsilicate, 1,2-ethanediyl hexamethyl disilicate, 1,2-propanediyl hexamethyl disilicate, 1,3-propanediyl hexamethyl disilicate, 1,4-butanediyl hexamethyl disilicate, 1,4-cyclohexylmethylenediyl hexamethyl disilicate, 1,2,6-hexanetriyl trisilicate. Like the alkoxysilanes the alkoxy silicates, in the presence of water and acid catalyst, can react with hydroxyl groups formed during epoxy ring opening, can self condense, and can react with other components, including melamine and alkoxy silanes, in the coating system. Alkoxy silicates produce polymers and crosslinks similar to alkoxy silanes and are useful because they are lower cost; however they are less hydrolysis resistant, an important consideration in outdoor exposure, particularly resistance to acid rain, a phenomenon called acid etch which is of particular importance for coatings used for high quality automotive finishes.

Often a useful balance of properties can be found in blends of silicates and silanes.

Since epoxide ring opening reactions are being used to cure or crosslink the coating, little or no regulated emission byproducts are released during the curing reaction. Furthermore, through the use of the above reactive diluents, these coating systems are not only tough and durable but are also able to be formulated as high solids coating systems that need not contain an added volatile solvent. By the term "reactive diluents" as used herein, it is meant low molecular weight functional compounds that reduce the viscosity of the coating composition and aid in leveling and film formation like solvents, but are reactive with the film forming and/or crosslinking agent so as to become a part of the film when the coating composition cures.

A curing catalyst, preferably a thermally latent blocked acid catalyst based on a strong acid, is typically added to the binder ingredients to catalyze the ring opening of the epoxide moieties of the cycloaliphatic epoxide and initiate the crosslinking reactions (cationic polymerization) with silanol groups formed on the alkoxy silanes and silicates. Generally, the coating composition includes catalyst in the range of from about 0.1 to 5% by weight, preferably 0.1 to 2%, based on the total weight of the binder.

The catalyst which is preferably used for the coating of the present invention is a thermally latent (i.e., thermally activated) cationically polymerizable compound which, although inactive at room temperature, has an action of cleaving to generate cation when heated to reach critical temperature and thus initiating cationic polymerization. Examples of this component include onium salt of nitrogen, or phosphorous, or sulfur each of which has a strong acid component such as $SbF_6^-$, or $BF_4^-$, as the non-nucleophilic anionic component (i.e., an anion which does not interfere with cationic polymerization).

Typical of such thermally activatable catalysts for ring opening the epoxy and initiating the crosslinking (cationic polymerization) reactions are quaternary ammonium salts of strong acids, such as quaternary amine blocked antimony fluoride, quaternary amine blocked triflic acid (also known as trifluoromethane sulfonic acid). Other thermally activatable strong acid catalysts which can be used include tertiary amine blocked antimony chloride, metal blocked triflic acid, Lewis acid catalysts (such as Nacure® Super A202 and Nacure® Super A218) and metal chelates (such as Nacure® XC-9206 which is commercially available from King Industries, Inc., Norwalk, Conn.) can also be used.

Especially preferred compounds can be selected from at least one of the following groups 1 to 4.

1) Quaternary Ammonium Salt Type Compounds:
For example, N,N-dimethyl-N-benzylanilinium antimony hexafluoride, N,N-diethyl-N-benzylanilinium boron tetrafluoride. Such catalysts are also commercially available from King Industries, Inc., Norwalk, Conn. under the tradename Nacure® Super XC-7231 which is the quaternary ammonium salt of hexafluoroantimonate.

2) Sulfonium Salt Type Compounds:
For example, triphenylsulfonium boron tetrafluoride, triphenylsulfonium antimony hexafluoride.

3) Metal Salt of triflic (i.e., trifluoromethane sulfonic) acid:
For example, Zinc triflate, Tin triflate. Such catalysts are also commercially available from King Industries under the tradename Nacure® SuperA202 or Nacure® Super A218.

4) Quaternary Ammonium Salt of trific (i.e., trifluoromethane sulfonic) acid:
Such catalysts are also commercially available from King Industries under the tradename Nacure® Super XC-A230.

In addition, mixtures of any of the forgoing can also be used. Other useful catalysts will readily occur to one skilled in the art.

It is possible to rely entirely on the above binder components and catalyst as the main film-forming components in the coating of this invention. Such compositions can be formulated to be 100% solids in nature, provided the viscosity is such that the coating composition can readily be applied. However, for suitable cross-link density and sufficiently short curing times, most primer compositions in conjunction with the present invention contain an additional crosslinking agent reactive with hydroxyl groups formed during ring opening of the epoxy resin the epoxy resin, and optionally with other hydroxy functional materials in the coating composition. Generally, the crosslinking agent will be used, as part of the binder, in amounts from about 0-40% by weight, preferably about 0-30% by weight, based on the weight of the binder. The crosslinking agent typically used in the composition is a polymeric or monomeric partially or fully alkylated melamine formaldehyde crosslinking agent. Preferably, the crosslinking agent is fully alkylated. Preferred crosslinking agents are a monomeric methylated, butylated, and/or isobutylated melamine formaldehyde resin. Such crosslinking agents typically have a number average molecular weight of about 500-1,500.

Additionally, the coating composition of this invention can include a number of other ingredients as are known in the art to enhance preparation of the composition as well as improve final properties of the coating composition and the finish. For example, it is often desirable to include additional low molecular weight film-forming binder polymers and/or oligomers and/or crosslinking agents and/or reactive diluents in the binder in conjunction with the above-mentioned components. Reactive diluents are particularly desired for their ability to reduce VOCs of the coating. These components are generally included in the coating, as part of the binder, in the range of 0 to 35% by weight, more preferably in the range of about 5 to 30% by weight, based on the weight of the binder.

Examples of such film-forming polymers and/or oligomers include acrylic polyols, acrylourethanes, acrylosilanes, polyester polyols, polyester urethanes, polyethers, polyether urethanes, and polyurethane polyols that are compatible with the other components of the binder. One particularly preferred class of film forming polymers are silane functional acrylic oligomers containing one or more hydrolyzable silane groups, such as alkoxy silane functional acrylosilane polymers, that are reactive with themselves and the hydroxyl groups of present in the composition to provide for additional crosslinking and a hard, tough, durable finish within a short period of time after application. Additional crosslinking agents, for example, any of the conventional blocked or unblocked polyisocyanate crosslinking agents, may also be used. Additional reactive diluents include low molecular weight polyester polyols, urethane diols, and caprolactone diols or polyols. By "low molecular weight" for this component, it is meant no more than about 3000 (number average).

One particularly preferred class of reactive diluents are linear caprolactone diols or polyols which contain terminal hydroxyl groups which may be prepared by initiating the polymerization of caprolactone with a cyclic polyol, particularly a cycloaliphatic diol, in the presence of a tin catalysts via conventional solution polymerization techniques. Such caprolactone oligomers are well known and described at length in Anderson et al. U.S. Pat. No. 5,354,797, hereby incorporated by reference. Epsilon($\epsilon$)-caprolactone is typically employed as the caprolactone component in a 1/1 to 5/1 molar ratio with a cycloaliphatic diol. Typically useful cycloaliphatic diol monomers include 1,4-cyclohexanediol and 1,4-cyclohexane dimethanol. Preferred caprolactone oligomers are formed from $\epsilon$-caprolactone and 1,4-cyclohexanedimethanol reacted in a molar ratio of 2/1 to 3/1.

The coating composition may further include one or more conventional additives. For example, to improve the weatherability of a finish produced by the present coating composition, the composition can contain about 0.1-5% by weight, based on the total weight of the binder, of ultraviolet light stabilizers which term includes ultraviolet light absorbers, screeners and quenchers. Typical ultraviolet light stabilizers include benzophenones, triazines, triazols, benzoates, hindered amines and blends of thereof. Also, an antioxidant can be added, in the about 0.1-5% by weight, based on the weight of the binder.

In addition, the composition according to the present invention can also include a variety of other conventional formulation additives, including plasticizers, dispersants, surfactants, flow control agents, for example, such as Resiflow® S (polybutylacrylate), BYK® 320 and 325 (high molecular weight polyacrylates), rheology control agents such as fumed silica, microgels, and non-aqueous dispersion polymers; water scavengers such as tetrasilicate, trimethyl orthoformate, triethyl orthoformate, and so on, as will readily occur to one skilled in the art.

The coating composition may further contain one or more pigments. Typical pigments that can be used in the composition are filler pigments such as talc, china clay, barytes, carbonates, silicates, metallic oxides such as titanium dioxide, zinc oxide and iron oxide and carbon black and organic colored pigments and dyes. When used as a primer, the resulting primer composition should have a pigment to binder weight ratio of about 1:100-150:100. A pigment to binder ratio of 75:100 is generally preferred.

The pigments can be introduced into the primer composition by first forming a mill base with the polyester copolymer or with another compatible polymer or dispersant by conventional techniques such as sand grinding, ball milling or attritor grinding. The mill base is blended with other constituents used in the composition.

A solvent may optionally be utilized in the coating composition of the present invention. Any of the conventional solvents or blends of solvents can be used, if needed, in the organic liquid carrier to disperse and/or dilute the above ingredients to form the primer composition, provided that the selection of solvents is such that the polymeric binder constituents are compatible and give a high quality primer. The following are examples of solvents that can be used to prepare the composition: methyl ethyl ketone, methyl amyl ketone, methyl isobutyl ketone, toluene, xylene, acetone, ethylene glycol monobutyl ether acetate and other esters, ethers, ketones and aliphatic and aromatic hydrocarbon solvents that are conventionally used.

In one particularly preferred primer composition, the binder contains about 30-50% by weight, based on the weight of the binder, of cycloaliphatic diepoxide or triepoxide resin, about 5-30% of caprolactone diol reactive diluent, about 5-30% of silicate or silane reactive diluent, and about 20-40% of a monomeric and/or polymeric alkylated melamine, which is methylated and butylated in a 1:1 molar ratio. The composition forms a hard cured coating on a substrate having excellent adhesion to the substrate and forms a smooth finish to which conventional topcoats can be applied.

The primer composition can be applied to a plastic or metal substrate by conventional techniques such as spraying, electrostatic spraying, dipping, brushing, flowcoating and the like. As mentioned above the preferred method is electrostatic spraying. After application, the composition is baked at about 120-200° C. for about 5-45 minutes to form a primer coating layer about 0.1-2.0 mils thick. Generally the primer layer is about 0.5-1.5 mils thick.

To achieve faster cure of the composition, particularly in conjunction with the optional crosslinking agent, an additional catalyst can be added to catalyze the crosslinking of reactive components present in the composition. Typical of such catalysts are sulfonic acids, such as dodecylbenzene sulfonic acid, either blocked or unblocked, are effective catalysts. Useful blocked acid catalysts are dodecyl benzene sulfonic acid blocked with an amine, such as amino methyl propanol or dimethyl oxazolidine. Other useful catalysts will readily occur to one skilled in the art. Preferably, these catalysts are used in the amount of about 0.1 to 5.0%, based on the weight of the binder.

The primer composition of this invention can readily be formulated into a one-package system which is stable during storage.

Conventional solvent based or water based acrylic enamels or lacquers, acrylic polyurethane coatings, polyesterurethane coatings, alkyd enamels and the like can be applied by electrostatic spraying over the primer and then baked to form a durable automotive or truck finish.

As indicated above, the present composition is especially useful as a primer surfacer when finishing the exterior of automobile and truck bodies and parts thereof. The present composition, depending on the presence of pigments and other conventional components, can also be used during finishing as a primer, monocoat, basecoat, and/or an unpigmented or slightly pigmented clearcoat.

The following example illustrates the invention. All parts and percentages are on a weight basis unless otherwise indicated. Molecular weights are determined by gel permeation chromatography using polymethyl methacrylate as the standard.

TESTING PROCEDURES USED IN THE EXAMPLES

Hardness—Tukon Hardness—test method ASTM D1474—a rating of at least 6 is an acceptable minimum.

60° Gloss—test method ASTM D523—a rating of at least 80 is an acceptable minimum.

Adhesion—the adhesion of 0 to 5 was determined in accordance with test method ASTM D3359—a rating of at least 4B is an acceptable minimum.

Chip Resistance—the chip resistance was determined utilizing a gravelometer and follows the procedure described in test method SAEJ400—a rating of at least 5 is an acceptable minimum.

Example 1

A gray color primer surfacer composition was prepared by mixing together the following ingredients in a suitable mixing vessel in the order shown:

| Components | Parts by weight |
| --- | --- |
| Cycloaliphatic Epoxide[1] (100% NV) | 7.6 |
| Caprolactone diol[2] (100% NV) | 15.3 |
| Silicate Reactive Diluent[3] (100% NV) | 6.3 |
| Flow Control Agent (50% NV)[4] | 0.1 |
| Flow Control Agent (10% NV)[5] | 1.7 |
| Monomeric fully methylated melamine formaldehyde[6] (99.8% NV) | 11.4 |
| White pigment dispersion[7] | 46.9 |
| Carbon black pigment dispersion[8] | 2.1 |
| Magnesium silicate pigment dispersion[9] | 3.6 |
| Amorphous Silica Dispersion[10] | 3.7 |
| Acid Catalyst Solution[11] | 1.3 |
| Total | 100.0 |

Table Footnotes
In this Table, the abbreviation "% NV" stands for % by weight non-volatile content or % by weight solids content.
[1] Cycloaliphatic epoxide ERL-4221 from Dow Chemical, Midland, Mich.
[2] Caprolactone diol prepared from epsilon-caprolactone and 1.4-cyclohexanedimethanol with a weight average molecular weight of 486 and a hydroxyl number of 230.
[3] 1,4-Cyclohexane dimethanol trimethoxy silicate.
[4] Disparlon ® LC-955 supplied by King Industries, Norwalk, Connecticut.
[5] Resiflow ® S supplied by Estron Chemicals, Inc., Parsippany, New Jersey.
[6] Cymel ® 301 monomeric methylated melamine supplied by Cytec Industries Inc., West Patterson, New Jersey.
[7] 68% Solids of titanium dioxide pigment dispersed in 29% solids of cycloaliphatic epoxide resin ERL-4221 and 3% weight of pigment dispersing agent which is 79% NV.
[8] 16% Solids of carbon black pigment dispersed in 19% solids of pigment dispersing agent in ester solvent.
[9] 28% Solids of magnesium silicate in polyester resin solution and butanol.
[10] 9% Solids of silica dispersion in acrylic resin solution and aromatic hydrocarbon solvent.
[11] 24% of Nacure ® Super XC-A230 quaternary salt of triflic acid from King Industries, Inc., Norwalk, Conn. in butylenes carbonate.

The resulting primer surfacer composition 1 has a theoretical solid content of 90% and a viscosity of 40 seconds measured with # 4 Ford cup. The analytical spray weight solids was 80-85%. This primer also had a VOC at the range of 1.0-1.4 lbs/gal.

The surfacer prepared above was applied by spraying a layer onto a phosphatized steel panel coated with a cured cathodic epoxy resin based electrodeposition primer. The primed panel was air flash dried for 5-10 minutes and baked at 150° C. for 30 minutes to form a layer about 25-32 micron dry. The primed panel was then topcoated with a commercially available automobile pigmented solventborne basecoat at 20-30 micron and wet on wet with acrylosilane clear coating composition (Gen IV ES from DuPont Company, Wilmington, Del.). Flashed dried for 10 minutes and baked for 30 minutes at 160° C.

The coatings on the panel had the following properties:

| | Primer only (Example 1) | | | Primer (Example 1) plus white topcoat | |
| --- | --- | --- | --- | --- | --- |
| Tukon | Gloss (60 degree) | Adhesion | Chip** (SAE J400) | Adhesion |
| 5.0 Knoop | 90 | 5 (No failure) | 6A | 5 (No failure) |

**Chip number rating 6 = 10-24 chips per standard area; A = diameter of chips less than 1 mm.

The above results show that it is possible to formulate a high quality baking primer surfacer suitable for automotive applications, having a VOC below 2.0 lbs/gallon and excellent adhesion and chip resistance.

Example 2

A gray color primer surfacer composition 2 was prepared by mixing together the following ingredients in a suitable mixing vessel in the order shown:

| Components | Parts by weight |
| --- | --- |
| Cycloaliphatic Epoxide[1] (100% NV) | 23.7 |
| Silicate Reactive Diluent[2] (100% NV) | 6.5 |
| Flow Control Agent (50% NV)[3] | 0.2 |
| Flow Control Agent (10% NV)[4] | 1.7 |
| Monomeric fully methylated melamine formaldehyde[5] (99.8% NV) | 11.8 |
| White pigment dispersion[6] | 45 |
| Carbon black pigment dispersion[7] | 2.3 |
| Magnesium silicate pigment dispersion[8] | 3.8 |
| Amorphous Silica Dispersion[9] | 3.8 |
| Acid Catalyst Solution[10] | 1.2 |
| Total | 100.0 |

Table Footnotes
In this Table, the abbreviation "% NV" stands for % by weight non-volatile content or % by weight solids content.
[1] Cycloaliphatic epoxide ERL-4221 from Dow Chemical, Midland, Mich.
[2] 1,4-Cyclohexane dimethanol trimethoxy silicate.
[3] Disparlon ® LC-955 supplied by King Industries, Norwalk, Connecticut.
[4] Resiflow ® S supplied by Estron Chemicals, Inc., Parsippany, New Jersey.
[5] Cymel ® 301 monomeric methylated melamine supplied by Cytec Industries Inc., West Patterson, New Jersey.
[6] Titanium dioxide pigment dispersion is made with 29% of cycloaliphatic epoxide resin ERL-4221, 3% weight of pigment dispersing agent and 68% of titanium dioxide.
[7] 16% Solids of carbon black pigment dispersed in 19% solids of pigment dispersing agent in ester solvent.
[8] 28% Solids of magnesium silicate in polyester resin solution and butanol.
[9] 9% Solids of silica dispersion in acrylic resin solution and aromatic hydrocarbon solvent.
[10] 24% of Nacure ® Super XC-A230 quaternary salt of triflic acid from King Industries, Inc., Norwalk, Conn. in butylenes carbonate.

The resulting primer surfacer composition 2 has a theoretical solid content of 89% and a viscosity of 57 seconds measured with # 4 Ford cup. The analytical spray weight solids was 79-84%. This primer also had a VOC at the range of 1.9-2.0 lbs/gal.

The surfacer 2 prepared above was applied by spraying a layer onto a phosphatized steel panel coated with a cured cathodic epoxy resin based electrodeposition primer. The primed panel was air flash dried for 5-10 minutes and baked at 150° C. for 30 minutes to form a layer about 25-32 micron dry. The primed panel was then topcoated with a commercially available automobile pigmented solventborne basecoat at 20-30 micron and wet on wet with acrylosilane clear coating composition (Gen. IV ES from DuPont Company, Wilmington, Del.). Flashed dried for 10 minutes and baked for 30 minutes at 160° C.

The coatings on the panel had the following properties:

| | Primer only (Example 2) | | Primer (example 2) plus white topcoat | |
|---|---|---|---|---|
| Tukon | Gloss (60 degree) | Adhesion | Chip** (SAE J400) | Adhesion |
| 14 Knoop | 92 | 5 (No failure) | 5A | 5 (No failure) |

**Chip number rating 5 = 25-49 chips per standard area; A = diameter of chips less than 1 mm.

Example 3

A gray color primer surfacer composition was prepared by mixing together the following ingredients in a suitable mixing vessel in the order shown:

| Components | Parts by weight |
|---|---|
| Cycloaliphatic Epoxide[1] (100% NV) | 18.9 |
| Caprolactone diol[2] (100% NV) | 14.7 |
| Silicate Reactive Diluent[3] (100% NV) | 5.7 |
| Flow Control Agent (50% NV)[4] | 1.2 |
| Flow Control Agent (10% NV)[5] | 2.5 |
| White pigment dispersion[6] | 42 |
| Carbon black pigment dispersion[7] | 2.1 |
| Magnesium silicate pigment dispersion[8] | 5.2 |
| Amorphous Silica Dispersion[9] | 5.4 |
| Acid Catalyst Solution[10] | 2.3 |
| Total | 100.0 |

[1]Cycloaliphatic epoxide ERL-4221 from Dow Chemical, Midland, Mich.
[2]Caprolactone diol prepared from episilon-caprolactone and 1.4-cyclohexanedimethanol with a weight average molecular weight of 486 and a hydroxyl number of 230.
[3]1,4-Cyclohexane dimethanol trimethoxy silicate.
[4]Disparlon ® LC-955 supplied by King Industries, Norwalk, Connecticut.
[5]Resiflow ® S supplied by Estron Chemicals, Inc., Parsippany, New Jersey.
[6]68% Solids of titanium dioxide pigment dispersed in 29% solids of cycloaliphatic epoxide resin ERL-4221and 3% weight of pigment dispersing agent which is 79% NV.
[7]16% Solids of carbon black pigment dispersed in 19% solids of pigment dispersing agent in ester solvent.
[8]28% Solids of magnesium silicate in polyester resin solution and butanol.
[9]9% Solids of silica dispersion in acrylic resin solution and aromatic hydrocarbon solvent.
[10]24% of Nacure ® Super XC-A230 quaternary salt of triflic acid from King Industries, Inc., Norwalk, Conn. in butylenes carbonate.

The resulting primer surfacer composition 3 has a theoretical solid content of 80% and a viscosity of 40 seconds measured with # 4 Ford cup. The analytical spray weight solids was 75-79%. This primer also had a VOC at the range of 2.0-2.3 lbs/gal.

The surfacer prepared above was applied by spraying a layer onto a phosphatized steel panel coated with a cured cathodic epoxy resin based electrodeposition primer. The primed panel was air flash dried for 5-10 minutes and baked at 150° C. for 30 minutes to form a layer about 25-32 micron dry. The primed panel was then topcoated with a commercially available automobile pigmented solventborne basecoat at 20-30 micron and wet on wet with acrylosilane clear coating composition (Gen IV ES from DuPont Company, Wilmington, Del.). Flashed dried for 10 minutes and baked for 30 minutes at 160° C.

The coatings on the panel had the following properties:

| | Primer only (Example 3) | | Primer (Example 3) plus white topcoat | |
|---|---|---|---|---|
| Tukon | Gloss (60 degree) | Adhesion | Chip** (SAE J400) | Adhesion |
| 3.0 Knoop | 90 | 5 (No failure) | 4AB | 5 (No failure) |

**Chip number rating 4 = 50-74 chips per standard area; A = diameter of chips less than 1 mm. B = diameter of chips less than 1-3 mm.

Various other modifications, alterations, additions or substitutions of the components of the compositions of this invention will be apparent to those skilled in the art without departing from the spirit and scope of this invention. This invention is not limited by the illustrative embodiments set forth herein, but rather is defined by the following claims.

What is claimed is:

1. A high-solids primer composition having a solids content of at least 80% by weight, based on weight of total coating composition, comprising a film-forming binder and pigments in a pigment to binder ratio of about 1:100-150:100; wherein the binder contains:
    (a) a cycloaliphatic or polycycloaliphatic epoxy resin; and
    (b) at least one reactive diluent consisting essentially of an alkoxy silicate compound, and
    (c) an effective amount of a thermally activated strong acid catalyst curing catalyst.

2. The primer composition of claim 1 wherein the binder further contains
    (d) a melamine crosslinking agent.

3. The primer composition of claim 2 wherein the binder further contains
    (e) a second reactive diluent selected from the group consisting caprolactone diols, caprolactone polyols, and mixtures thereof.

4. The primer composition of claim 1 having a VOC content of less than 0.24 kilogram of organic solvent per liter (2 pounds per gallon).

5. The primer composition of claim 1 wherein the solids content is at least about 90%.

6. The primer composition of claim 1 comprising up to about 20% by weight based on total weight of said composition of volatile organic liquid carrier.

7. The primer composition of claim 1 in which the catalyst is selected from the group consisting of quaternary amine blocked antimony fluoride, quaternary amine blocked triflic acid, metal blocked triflic acid, and mixtures thereof.

8. A substrate coated with a dried and cured layer of the composition of claim 1.

9. The substrate of claim 8 in which the substrate is a metal.

10. The substrate of claim 8 in which the substrate is a plastic.

11. The substrate of claim 8 in which the substrate is a plastic reinforced with fiberglass.

12. The substrate of claim 8 in which the substrate is a vehicle body or part thereof.

13. The primer composition of claim 1, wherein the composition is a primer surfacer for a vehicle.

14. A primer composition having a solids content of at least 80% by weight, based on weight of total coating composition and a VOC of less than 0.24 kilogram of organic solvent per liter (2 pounds per gallon), comprising a film-forming binder end pigments in a pigment to binder ratio of about 1:100-150:100; wherein the binder contains about:
- (a) 30-95% by weight, based on the weight of the binder, of cycloaliphatic or polycycloaliphatic epoxy resin;
- (b) 5-30% by weight, based on the weight of the binder, of an alkoxy silicate reactive diluent; and
- (c) 0-40% by weight, based on the weight of the binder, of a monomeric or polymeric alkylated melamine formaldehyde crosslinking agent;

wherein the composition also comprises an effective amount of a curing catalyst for reacting components (a) and (b).

15. The primer composition of claim 14, which can further contains as part of the binder:

- (d) 0-35% by weight, based on the weight of the binder, of a caprolactone diol or polyol reactive diluent.

16. A thermosetting coating composition having a solids content of at least 80% by weight, based on weight of total coating composition, comprising a film-forming binder and optional pigments; wherein the binder contains:
- (a) a cycloaliphatic or polycycloaliphatic epoxy resin;
- (b) at least one alkoxy silicate reactive diluent; and
- (c) a thermally activated strong acid catalyst.

17. The composition of claim 16 wherein the strong acid catalyst is selected from the group consisting of quaternary amine blocked salts of antimony fluoride, quaternary amine blocked salts of triflic acid, end mixtures thereof.

* * * * *